(12) United States Patent
Yoneda

(10) Patent No.: US 11,749,482 B2
(45) Date of Patent: Sep. 5, 2023

(54) PROTECTION ELEMENT

(71) Applicant: DEXERIALS CORPORATION, Tokyo (JP)

(72) Inventor: Yoshihiro Yoneda, Tokyo (JP)

(73) Assignee: DEXERIALS CORPORATION, Tochigi (JP)

( * ) Notice: Subject to any disclaimer, the term of this patent is extended or adjusted under 35 U.S.C. 154(b) by 173 days.

(21) Appl. No.: 17/309,047

(22) PCT Filed: Nov. 6, 2019

(86) PCT No.: PCT/JP2019/043373
§ 371 (c)(1),
(2) Date: Apr. 16, 2021

(87) PCT Pub. No.: WO2020/095917
PCT Pub. Date: May 14, 2020

(65) Prior Publication Data
US 2022/0277917 A1 Sep. 1, 2022

(30) Foreign Application Priority Data
Nov. 7, 2018 (JP) .................................. 2018-209897

(51) Int. Cl.
*H01H 85/143* (2006.01)
*H01H 85/00* (2006.01)
(Continued)

(52) U.S. Cl.
CPC ...... *H01H 85/143* (2013.01); *H01H 85/0039* (2013.01); *H01H 85/0052* (2013.01); *H01H 85/06* (2013.01); *H01H 85/08* (2013.01)

(58) Field of Classification Search
CPC ......... H01H 2037/763; H01H 85/0039; H01H 85/0052; H01H 85/06; H01H 85/08; H01H 85/36
See application file for complete search history.

(56) References Cited

U.S. PATENT DOCUMENTS 2,921,167 A * 1/1960 Dahlen ................. H01H 85/36
337/296
3,198,914 A * 8/1965 Baran ................... H01H 85/36
337/414
(Continued)

FOREIGN PATENT DOCUMENTS

JP         48045248 U1     6/1973
JP         06020574 A      1/1994
(Continued)

OTHER PUBLICATIONS

"Korean Application Serial No. 10-2021-7012044, Office Action dated Jul. 22, 2022", w English Translation, (dated Jul. 22, 2022), 10 pgs.
(Continued)

*Primary Examiner* — Jacob R Crum
(74) *Attorney, Agent, or Firm* — Schwegman Lundberg & Woessner, P.A.

(57) ABSTRACT

A protection element includes a first electrode (1), a second electrode (2) having a spring property, and a fuse element material (3) that is disposed between the first electrode and the second electrode, in which the fuse element material (3) is supported by being interposed between the first electrode (1) and the second electrode (2) in a bent state.

20 Claims, 12 Drawing Sheets

(51) Int. Cl.
  *H01H 85/06* (2006.01)
  *H01H 85/08* (2006.01)

(56) References Cited

U.S. PATENT DOCUMENTS

| | | | | |
|---|---|---|---|---|
| 3,436,712 | A * | 4/1969 | Heaney | H01H 37/761 |
| | | | | 337/401 |
| 2008/0117016 | A1* | 5/2008 | Yu | H01H 85/36 |
| | | | | 337/401 |
| 2013/0033355 | A1* | 2/2013 | Meyer | H05K 1/0201 |
| | | | | 337/147 |
| 2015/0084734 | A1* | 3/2015 | Yoneda | H01H 85/06 |
| | | | | 337/183 |
| 2016/0049275 | A1* | 2/2016 | Stöäzinger | H01H 85/055 |
| | | | | 337/186 |
| 2017/0110279 | A1* | 4/2017 | Yang | H01H 37/761 |

FOREIGN PATENT DOCUMENTS

| | | |
|---|---|---|
| JP | 06084446 A | 3/1994 |
| JP | 2006059568 A | 3/2006 |
| JP | 4192266 B2 | 12/2008 |
| JP | 2012043573 A | 3/2012 |
| JP | 2012234774 A | 11/2012 |
| JP | 2015018740 | 1/2015 |
| JP | 6249600 B2 | 12/2017 |
| JP | 6249602 B2 | 12/2017 |
| KR | 20160097740 | 8/2016 |
| KR | 20180072815 | 6/2018 |
| WO | WO-2018159283 A1 | 9/2018 |

OTHER PUBLICATIONS

"Korean Application Serial No. 10-2021-7012044, Office Action dated Jul. 27, 2022", w English Translation, (dated Jul. 27, 2022), 10 pgs.

"International Application Serial No. PCT/JP2019/043373, International Preliminary Report on Patentability dated Dec. 9, 2020", w/ English Claims, (dated Dec. 9, 2020), 12 pgs.

"International Application Serial No. PCT/JP2019/043373, International Search Report dated Jan. 28, 2020", w/ English Translation, (dated Jan. 28, 2020), 6 pgs.

"International Application Serial No. PCT/JP2019/043373, Written Opinion dated Jan. 28, 2020", (dated Jan. 28, 2020), 4 pgs.

* cited by examiner

PROTECTION ELEMENT

PRIORITY APPLICATIONS

This application is a U.S. National Stage Filing under 35 U.S.C. § 371 from International Application No. PCT/JP2019/043373, filed on Nov. 6, 2019, and published as WO2020/095917 on May 14, 2020, which claims the benefit of priority to Japanese Application No. 2018-209897, filed on Nov. 7, 2018; the benefit of priority of each of which is hereby claimed herein, and which applications and publication are hereby incorporated herein by reference in their entireties.

TECHNICAL FIELD

The present invention relates to a protection element.

Priority is claimed on Japanese Patent Application No. 2018-209897, filed on Nov. 7, 2018, the content of which is incorporated herein by reference.

BACKGROUND ART

Conventionally, as a protection element of an electric circuit, a protection element (fuse element) including a fuse element that interrupts a current path by generating heat and being blown out when a current exceeding a rating flows therethrough has been used.

As the protection element, for example, a fuse fixed by a holder in which a solder is enclosed in a glass tube, a chip fuse in which an Ag electrode is printed onto a ceramic substrate surface, and a screw-in or insertion type protection element in which a part of a copper electrode is made thin and assembled into a plastic case are often used.

In such a protection element, surface mounting using reflow is difficult and the efficiency of component mounting becomes low. Therefore, a surface mounting type protection element has been developed in recent years (see, for example, Patent Documents 1 and 2).

The surface mounting type protection element is adopted as, for example, a protection element for an overcharging or an overcurrent of a battery pack using a lithium ion secondary battery. Lithium ion secondary batteries are used in mobile devices, such as notebook computers, mobile phones, and smartphones, and in recent years, lithium ion secondary batteries are also used in electric tools, electric bicycles, electric bikes, and electric vehicles. Therefore, a protection element for large current and high voltage is required.

In the protection element for high voltage, an arc discharge may occur when a fuse element is blown out. When an arc discharge is generated, the fuse element may be melted over a wide range and vaporized metal may be scattered. In this case, a new current path may be formed by the scattered metal, or the scattered metal may adhere to a terminal or surrounding electronic components. Therefore, in the protection element for high voltage, measures are taken to prevent arc discharge from being generated or to stop the arc discharge.

As the measures to prevent the arc discharge from being generated or to stop the arc discharge, packing an arc-extinguishing material around the fuse element is known (see, for example, Patent Document 3).

As another method for stopping the arc discharge, a protection element of a type in which a fuse element and a spring in a state where elastic restoring force is stored are connected in series and joined by a low melting point metal is known (see, for example, Patent Documents 4 to 6). In this type of protection element, when an overcurrent flows and the low melting point metal is melted, the elastic restoring force of the spring promotes separation of the spring and the fuse element, thereby enabling quick interruption of the overcurrent.

The arc discharge depends on an electric field strength (voltage/distance), and the arc discharge does not stop until a distance between contacts is equal to or more than a certain interval. Therefore, the protection element of the spring-using type quickly stops the arc discharge by quickly separating the spring and the fuse element to a distance where the arc discharge cannot be maintained by using the elastic restoring force of the spring.

CITATION LIST

Patent Literature

[Patent Document 1]
Japanese Patent No. 6249600
[Patent Document 2]
Japanese Patent No. 6249602
[Patent Document 3]
Japanese Patent No. 4192266
[Patent Document 4]
Japanese Unexamined Patent Application, First Publication No. H06-84446
[Patent Document 5]
Japanese Unexamined Patent Application, First Publication No. 2006-59568
[Patent Document 6]
Japanese Unexamined Patent Application, First Publication No. 2012-234774

SUMMARY OF INVENTION

Technical Problem

However, in the protection element using the arc-extinguishing material, a manufacturing process becomes complicated, miniaturization of the protection element is difficult, and there is a concern that blowing-out of a fuse element material by heat generation of a heat generating body in the protection element is hindered.

In addition, in the protection element using the spring, the joining strength of the fuse element and the spring is likely to decrease with time in a use environment, and there is a concern about long-term stability.

The present invention has been made in view of the above problems, and an object of the present invention is to provide a protection element capable of quickly preventing an arc discharge when an overcurrent is interrupted by utilizing the elastic restoring force of a spring while ensuring long-term stability.

Solution to Problem

The present invention provides the following means for solving the above problem.

(1) A protection element according to an aspect of the present invention includes a first electrode, a second electrode having a spring property, and a fuse element material that is disposed between the first electrode and the second electrode, in which the fuse element material is supported by being interposed between the first electrode and the second electrode in a bent state.

(2) In the protection element according to (1), a shearing force that is configured to cause the fuse element material to be sheared when an overcurrent flow may be applied to the fuse element material from the first electrode and the second electrode.

(3) In the protection element according to (1) or (2), at least one of the first electrode and the second electrode may be joined to the fuse element material by solder.

(4) In the protection element according to any one of (1) to (3), each of the first electrode and the second electrode may have a claw portion at one end thereof, and the fuse element material may be supported by being interposed between the claw portion of the first electrode and the claw portion of the second electrode.

(5) In the protection element according to (4), each of the first electrode and the second electrode may have one claw portion or a plurality of the claw portions, and the fuse element material may be supported by being interposed among three or more claw portions of the first electrode and the second electrode, the claw portions being arranged alternately.

(6) In the protection element according to (4) or (5), a tip of at least a part of the claw portions of the first electrode and the second electrode may be bent toward the fuse element material.

(7) In the protection element according to any one of (1) to (6), the first electrode may have a spring property, and may be supported by being interposed between the first electrode in a bent state and the second electrode in a bent state.

(8) In the protection element according to any one of (1) to (7), the fuse element material may be made of a laminate including a high melting point metal layer and a low melting point metal layer.

(9) In the protection element according to (8), the low melting point metal layer may be made of a Pb-free solder, and the high melting point metal layer may be made of Ag or Cu, or an alloy containing Ag or Cu as a main component.

(10) In the protection element according to any one of (1) to (9), each of the first electrode and the second electrode may have an external terminal hole.

(11) In the protection element according to any one of (1) to (10), a first terminal member may be connected to the first electrode, and a second terminal member may be connected to the second electrode.

(12) The protection element according to any one of (1) to (11) may further include a heat generating body that is configured to heat the fuse element material and a third electrode that is configured to supply a current to the heat generating body.

(13) In the protection element according to (12), the heat generating body may have one end connected to the third electrode and the other end connected to at least one of the fuse element material, the first electrode, and the second electrode.

(14) In the protection element according to (12) or (13), a third terminal member may be connected to the third electrode.

Advantageous Effects of Invention

According to the present invention, it is possible to provide a protection element capable of quickly preventing an arc discharge when an overcurrent is interrupted by utilizing the elastic restoring force of a spring while ensuring long-term stability.

DESCRIPTION OF EMBODIMENTS

Figure 1:
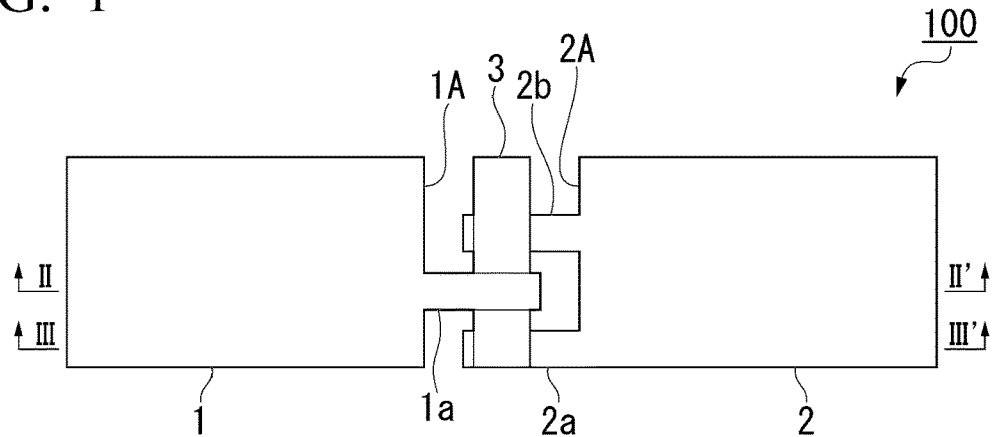
FIG. 1 is a schematic plan view of an example of a protection element according to a first embodiment.

Hereinafter, the present embodiment will be described in detail with reference to the drawings as appropriate. In the drawings used in the following description, in order to make the features easy to understand, the featured portions may be enlarged and shown, and a dimension ratio and the like of each component may be different from an actual state. The materials, dimensions, and the like in the following description are merely exemplary examples, and the present invention is not limited thereto, and can be appropriately modified and carried out within a range in which effects of the present invention are exhibited.

First Embodiment

Figure 2:
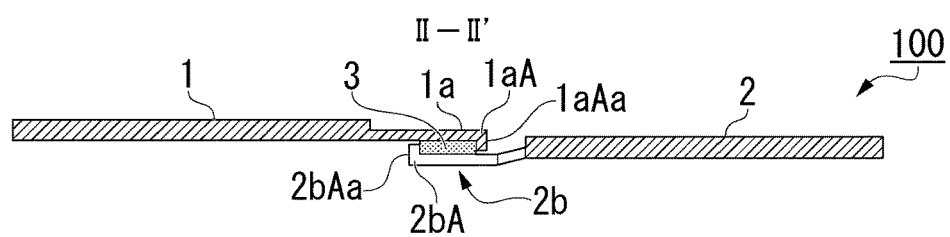
FIG. 2 is a schematic cross-sectional view of the protection element shown in FIG. 1 cut along a line II-II' in FIG. 1.

FIG. 1 is a schematic plan view of an example of a protection element according to a first embodiment. FIG. 2 is a schematic cross-sectional view of the protection element shown in FIG. 1 cut along a line II-II' in FIG. 1, and FIG. 3 is a schematic cross-sectional view of the protection element shown in FIG. 1 cut along a line III-III' in FIG. 1.

Figure 3:
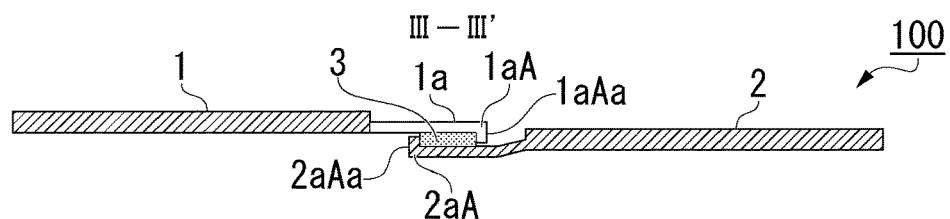
FIG. 3 is a schematic cross-sectional view of the protection element shown in FIG. 1 cut along a line III-III' in FIG. 1.

A protection element 100 shown in FIGS. 1 to 3 includes a first electrode 1, a second electrode 2 having a spring property, and a fuse element material 3 disposed between the first electrode 1 and the second electrode 2. The fuse element material 3 is supported by being interposed between the first electrode 1 and the second electrode 2 in a bent state.

<First Electrode>

The first electrode 1 is made of a conductive material. As the conductive material, for example, a metal (including an alloy) can be used. Specific examples of the conductive material include copper, brass, nickel, stainless steel, and 42 alloy. As will be described below, when the first electrode 1 itself has the same spring property as the second electrode 2, the same material as the second electrode 2 can be used.

Although a shape of the first electrode 1 (a shape of a portion other than a claw portion described below) is rectangular as a whole in a plan view as shown in FIG. 1, any shape can be used as long as the effects of the present invention are exhibited. In the example shown in FIG. 1, the first electrode 1 is a plate-shaped member.

In the example shown in FIG. 1, the first electrode 1 has a claw portion 1a for stably supporting the fuse element material 3 at one end 1A thereof. In addition, in the example shown in FIG. 1, a tip 1aA of the claw portion 1a of the first electrode 1 is provided with a bent portion 1aAa bent toward the fuse element material 3 in order to support the fuse element material 3 more stably. That is, the bent portion 1aAa has a function of preventing the fuse element material 3 from coming off.

In the example shown in FIG. 1, although the first electrode 1 has one claw portion, the number of claw portions may be two or more. When a plurality of the claw portions are provided, the claw portions may be the same as or different from each other. In addition, a position of the claw portion 1a at one end 1A can be optionally selected as long as it can be stably supported.

Figure 4:
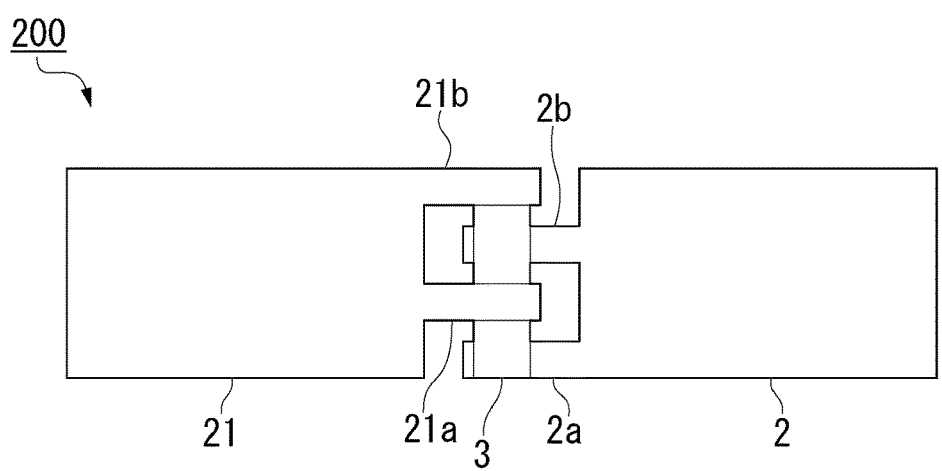
FIG. 4 is a schematic plan view of another example of the protection element according to the first embodiment.

FIG. 4 is a schematic plan view of another example of the protection element according to the first embodiment. In a protection element 200 shown in FIG. 4, a first electrode 21 has two claw portions (21a and 21b). In FIG. 4, the members having the same reference numerals as those in FIG. 1 are regarded as similar members, and a description thereof will be omitted.

The thickness of the first electrode 1 is not limited, but may be about 0.05 to 0.5 mm.

<Second Electrode>

The second electrode 2 is made of a conductive material having a spring property. As the conductive material having a spring property, a metal (including an alloy) can be an exemplary example. Among them, a metal material (including an alloy) having a low resistance and suitable for a leaf spring material is preferable, and specific materials thereof include a phosphor bronze, a copper alloy, a titanium copper, a Corson alloy, a beryllium copper, and the like.

Here, in the present specification, the term "spring property" means a property of being deformed when a force is applied and returning to the original state when the force is removed, and specifically, it means that an electrode that supports the fuse element material 3 in a bent state returns to a position before the bending after the fuse element material 3 is cut by an overcurrent. That is, in the protection element 100 of the present embodiment, the fuse element material 3 is supported so as to be interposed in a state where an electrode is bent within a range where elastic deformation is possible. An entire electrode or a part of the electrode may be set to the bent state. When the fuse element material 3 is supported in a state where a part of the electrode is bent (for example, in a case of FIG. 1), an electrode having a spring property is a part of the bent electrode.

Although a shape of the second electrode 2 is rectangular as a whole in a plan view as shown in FIG. 1, any shape can be used as long as the effects of the present invention are exhibited. In the example shown in FIG. 1, the second electrode 2 is a plate-shaped member.

In the example shown in FIG. 1, the second electrode 2 has claw portions 2a and 2b for supporting the fuse element material 3 at one end 2A thereof. In addition, in the example shown in FIG. 1, a tip 2aA of the claw portion 2a of the second electrode 2 is provided with a bent portion 2aAa bent toward the fuse element material 3 in order to support the fuse element material 3 more stably. Also, a tip 2bA of the claw portion 2b has a bent portion 2bAa. In the example shown in FIG. 1, the second electrode 2 has the two claw portions 2a and 2b, but the number of claw portions may be one or three or more.

When a plurality of the claw portions 2a and 2b are provided as in the example shown in FIG. 1, the claw portions may be the same as or different from each other. As shown in the example shown in FIG. 1, since the fuse element material 3 is supported in a state where the claw portions 2a and 2b of the second electrode 2 are bent, a configuration (width, thickness, and shape) of the claw portions 2a and 2b greatly influences cutting or shearing of the fuse element material 3.

Here, in the present specification, the term "shearing" means an action of clipping a fuse element material. In addition, the term "shearing force" described below means a force which, when a pair of forces in mutually opposite directions are applied parallel to a certain section of the fuse element material 3, causes the fuse element material 3 to slip off along the surface. A pair of forces in mutually opposite directions are applied to the fuse element material 3 from the claw portion 1a of the first electrode 1 and the claw portions 2a and 2b of the second electrode 2.

The thickness of the second electrode 2 is not limited, but may be about 0.05 to 0.5 mm.

The thickness of the second electrode 2 may be the same as a whole, or may have portions having different thicknesses. For example, only a portion (the claw portions 2a and 2b in the example of FIG. 1) that supports the fuse element material 3 in an interposed manner is thinned and the other portions are not thinned, whereby the spring property for interposing a fuse element material can be enhanced while maintaining rigidity as a connection terminal to the outside.

As a method for thinning a part of the second electrode 2, for example, a known metal processing method such as rolling can be used.

<Fuse Element Material>

As the fuse element material 3, a material used for a known fuse element can be used. The fuse element material 3 is a member that does not substantially deform (within the range in which the effects of the present invention are exhibited) even when a force is applied at a temperature caused by current supply during normal operation of a device including a protection element. Otherwise, the fuse element material 3 is deformed with time and does not function as a fuse element material. Accordingly, the fuse element material 3 is not a thin piece that deforms when a force is applied but a bulk material (plate-shaped, rod-shaped, and square-timber-shaped) that does not deform even when a force is applied.

The fuse element material 3 is supported by being interposed between the first electrode 1 and the second electrode 2 in a bent state. More specifically, in the examples shown in FIGS. 1 to 3, the fuse element material 3 is supported in an interposed state by the claw portion 1a of the first electrode 1 and the claw portions 2a and 2b of the second electrode 2 in a bent state. Here, it is preferable that the claw portion 1a of the first electrode 1 and the claw portions 2a and 2b of the second electrode 2 are arranged alternately as shown in FIG. 1. That is, it is preferable that the claw portion 2a, the claw portion 1a, and the claw portion 2b are arranged in this order so as not to overlap each other in a plan view.

A dimension (thickness, width, and length depending on the shape) of the fuse element material 3 can be any dimension which can be cut by the first electrode 1 and the second electrode 2 in a bent state by flow of an overcurrent, in a case where the configuration of the fuse element material 3 is such that deformation does not occur by current supply during normal operation (within the range in which the effects of the present invention are exhibited).

In the protection element 100, the fuse element material 3 is supported by being interposed from upper and lower sides between the claw portions 2a and 2b of the second electrode 2 having a spring property in a bent state and the claw portion 1a of the first electrode 1. The second electrode 2 is bent so as to return to the claw portion 1a side of the first electrode 1. Therefore, a force is applied to the fuse element material 3 from the claw portions 2a and 2b of the second electrode 2 toward the claw portion 1a of the first electrode 1, and a force is applied thereto from the first electrode 1 toward the second electrode 2. That is, a force is applied to the fuse element material 3 in opposite directions from the first electrode 1 and the second electrode 2.

In this state, when an overcurrent flows through a device including the protection element 100 and a temperature of the fuse element material 3 becomes higher than a temperature caused by current supply during normal operation, and as a result, the fuse element material 3 becomes soft or semi-melted, the fuse element material 3 is cut or sheared by the force applied from the claw portion 1a of the first electrode 1 and the claw portions 2a and 2b of the second electrode 2, and a circuit current is interrupted. As described above, the protection element 100 is different from the protection element of the spring-using type described above in which a fuse element and a spring are separated from each other in that the fuse element material 3 itself is physically cut. When the fuse element material 3 is cut not only in a softened state without melting but also in a partially unmelted state, the fuse element material 3 may be cut in a manner which cannot be said to be shearing by the shearing force, although it may be said that shearing is caused by the shearing force in many cases.

Since an arc discharge depends on an electric field strength which is inversely proportional to a distance, it is necessary to increase a distance between cut surfaces of the fuse element material 3 after cutting. In the protection element 100, a distance between the cut surface of the fuse element material 3 cut by the claw portion 1a of the first electrode 1 and the cut surface of the fuse element material 3 cut by the claw portions 2a and 2b of the second electrode 2 is rapidly increased by the elastic restoring force (force that returns to the original state due to the spring property) of the claw portions 2a and 2b of the second electrode 2. Therefore, the arc discharge can be quickly stopped.

In addition, in the protection element 100, since the fuse element material 3 can be cut at a temperature at which the fuse element material 3 becomes soft before reaching a molten state, that is, at a temperature lower than a temperature at which the fuse element material 3 reaches the molten state, the risk of the arc discharge can be reduced.

The fuse element material 3 may be made of a laminate including a high melting point metal layer and a low melting point metal layer. In a case of this configuration, the fuse element material 3 is softened at a lower temperature by providing the low melting point metal layer while maintaining rigidity of the fuse element material 3 by the high melting point metal layer, or put into a semi-molten state, so that the fuse element material can be cut.

As a low melting point metal used for the low melting point metal layer, it is preferable to use a solder such as a Pb-free solder containing Sn as a main component. This is because the solder containing Sn as a main component has a low melting point and becomes soft at low temperatures due to Sn having a melting point of 217° C.

As a high melting point metal used for the high melting point metal layer, it is preferable to use Ag, Cu, or an alloy containing these as a main component. For example, since Ag has a melting point of 962° C., the high melting point metal layer made of an alloy containing Ag as a main component can maintain rigidity at a temperature at which the low melting point metal layer becomes soft.

Various structures can be adopted as a structure of the laminate. FIGS. 5 to 8 are perspective views schematically showing an example of the structure of the laminate.

Figure 5:
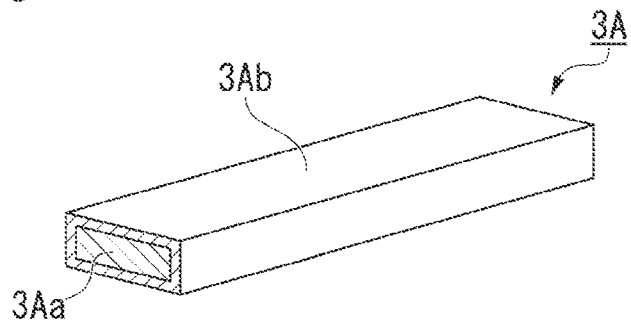
FIG. 5 is a perspective view schematically showing an example of a structure of a fuse element material that can be used for the protection element according to the first embodiment.

A laminate (fuse element material) 3A shown in FIG. 5 has a rectangular shape or a plate shape, and has a low melting point metal layer 3Aa as an inner layer and a high melting point metal layer 3Ab as an outer layer. The low melting point metal layer 3Aa may be used as an outer layer, and the high melting point metal layer 3Ab may be used as an inner layer.

Figure 6:
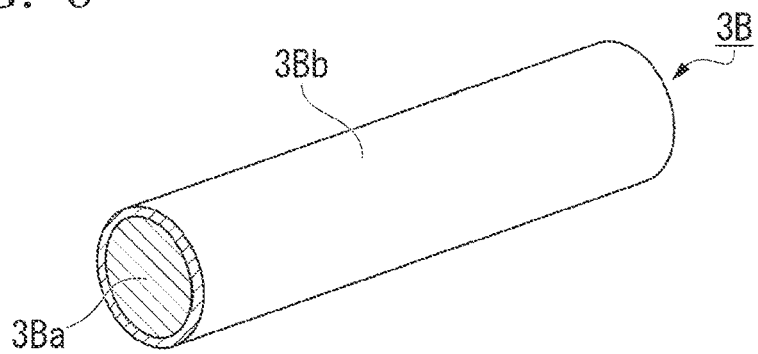
FIG. 6 is a perspective view schematically showing another example of the structure of the fuse element material that can be used for the protection element according to the first embodiment.

A laminate (fuse element material) 3B shown in FIG. 6 has a round bar shape, and has a low melting point metal layer 3Ba as an inner layer and a high melting point metal layer 3Bb as an outer layer. The low melting point metal layer 3Ba may be used as an outer layer, and the high melting point metal layer 3Bb may be used as an inner layer.

Figure 7:
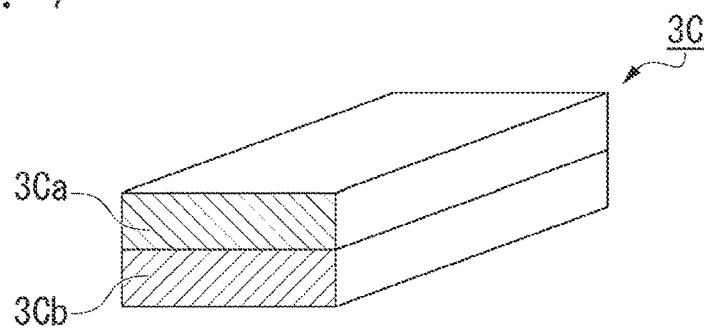
FIG. 7 is a perspective view schematically showing still another example of the structure of the fuse element material that can be used for the protection element according to the first embodiment.

A laminate (fuse element material) 3C shown in FIG. 7 has a rectangular shape or a plate shape, and has a two-layer structure in which a low melting point metal layer 3Ca and a high melting point metal layer 3Cb are laminated.

Figure 8:
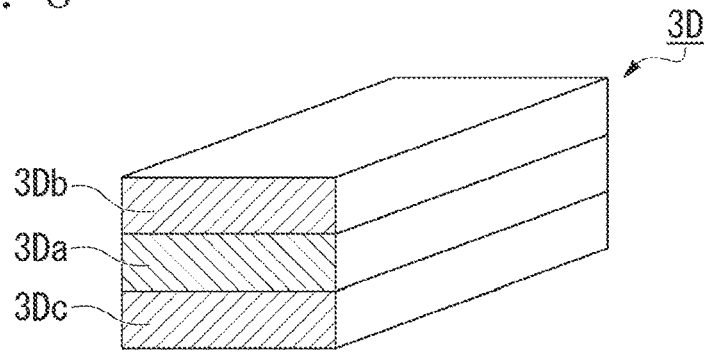
FIG. 8 is a perspective view schematically showing still another example of the structure of the fuse element material that can be used for the protection element according to the first embodiment.

A laminate (fuse element material) 3D shown in FIG. 8 has a rectangular shape or a plate shape, and has a three-layer structure in which a low melting point metal layer 3Da is sandwiched between an upper high melting point metal layer 3Db and a lower high melting point metal layer 3Dc. On the contrary, a three-layer structure in which a high melting point metal layer is sandwiched between two low melting point metal layers may be adopted.

Although the laminates (fuse element materials) 3A to 3D shown in FIGS. 5 to 8 are two-layer or three-layer laminates, the number of lamination layers of the low melting point metal layer and the high melting point metal layer is not particularly limited. The fuse element material may be a laminate having four or more layers.

At least one of the first electrode 1 and the second electrode 2 and the fuse element material 3 are preferably joined to each other by solder, and both the first electrode 1 and the second electrode 2 are more preferably joined to the fuse element material 3 by solder. This is for lowering the electric resistance between the first electrode 1 or the second electrode 2 and the fuse element material 3. Although a known material can be used as a material of the solder, a material containing Sn as a main component is preferable from the viewpoint of resistivity and melting point.

Second Embodiment

Figure 9:
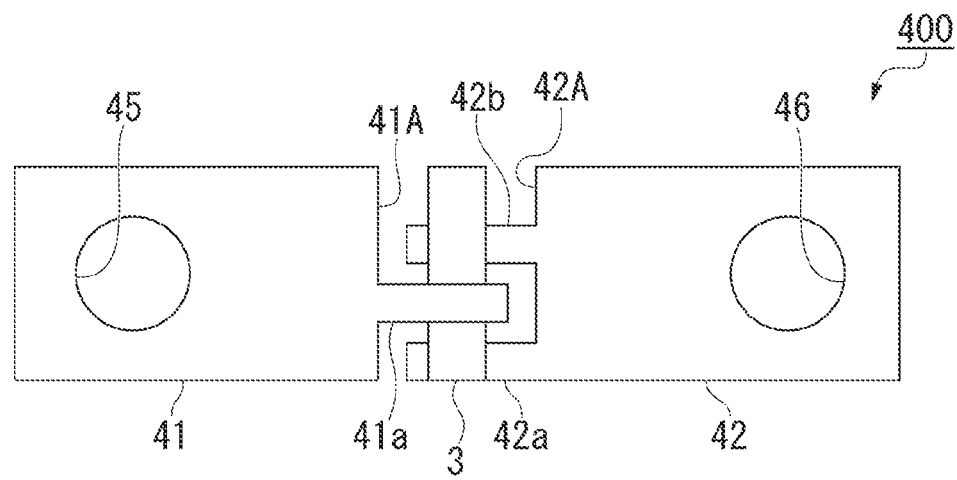
FIG. 9 is a schematic plan view of an example of a protection element according to a second embodiment.

FIG. 9 is a schematic plan view of a protection element according to a second embodiment. The members using the same reference numerals as those in the first embodiment have the same configuration, and a description thereof will be omitted. Further, even though the reference numerals are different from those of the first embodiment, a description of the members having the same function may be omitted.

The protection element according to the second embodiment is mainly different from the protection element according to the first embodiment in that the first electrode and the second electrode each have an external terminal hole. That is, while the protection element according to the first embodiment is used in a state of being attached with an external terminal separately, the protection element according to the second embodiment has a configuration in which the first electrode and the second electrode are integrally formed with the external terminals.

Specifically, a protection element 400 shown in FIG. 9 includes a first electrode 41, a second electrode 42 having a spring property, and a fuse element material 3 disposed between the first electrode 41 and the second electrode 42. The fuse element material 3 is supported by being interposed between the first electrode 41 and the second electrode 42 in a bent state, and the first electrode 41 and the second electrode 42 have external terminal holes 45 and 46, respectively.

<External Terminal Hole>

The external terminal holes 45 and 46 are provided in the first electrode 41 and the second electrode 42, respectively. Of a pair of the external terminal holes 45 and 46, one external terminal hole can be used for connection to a power supply side, and the other external terminal hole can be used for connection to a load side. Here, shapes of the external terminal holes 45 and 46 are not particularly limited as long as they can engage with terminals on the power supply side or the load side (not shown). Although the external terminal holes 45 and 46 shown in FIG. 9 are through-holes without an open portion, for example, a claw shape having an open portion in a part may be used as shown in FIG. 10.

The first electrode 41 can be made of the same material as the first electrode 1 of the first embodiment. In addition, the second electrode 42 can be made of the same material as the second electrode 2 of the first embodiment.

Figure 10:
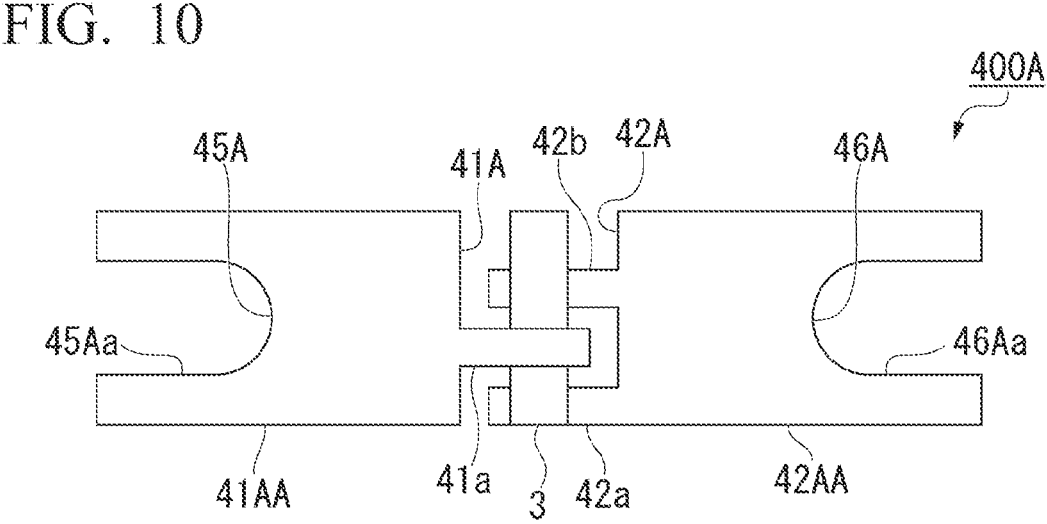
FIG. 10 is a schematic plan view of another example of the protection element according to the second embodiment.

FIG. 10 is a schematic plan view of a modification example of the protection element according to the second embodiment. In the modification example shown in FIG. 10, a shape of an external terminal hole is different from the example shown in FIG. 9. The same members as those of the protection element 400 shown in FIG. 9 are denoted by the same reference numerals, and a description thereof will be omitted.

Specifically, a protection element 400A shown in FIG. 10 includes a first electrode 41AA, a second electrode 42AA having a spring property, and a fuse element material 3 disposed between the first electrode 41AA and the second electrode 42AA. The fuse element material 3 is supported by being interposed between the first electrode 41AA and the second electrode 42AA in a bent state, and the first electrode 41AA and the second electrode 42AA respectively have external terminal holes 45A and 46A having open parts 45Aa and 46Aa in parts.

The position of the open part of an external terminal hole can be appropriately selected. In the protection element 400A shown in FIG. 10, the open parts 45Aa and 46Aa of the external terminal holes 45A and 46A are respectively located on sides of the first electrode 41AA and the second electrode 42AA opposite to a side connected to the fuse element material 3, but may be located at different positions.

Third Embodiment

Figure 11:
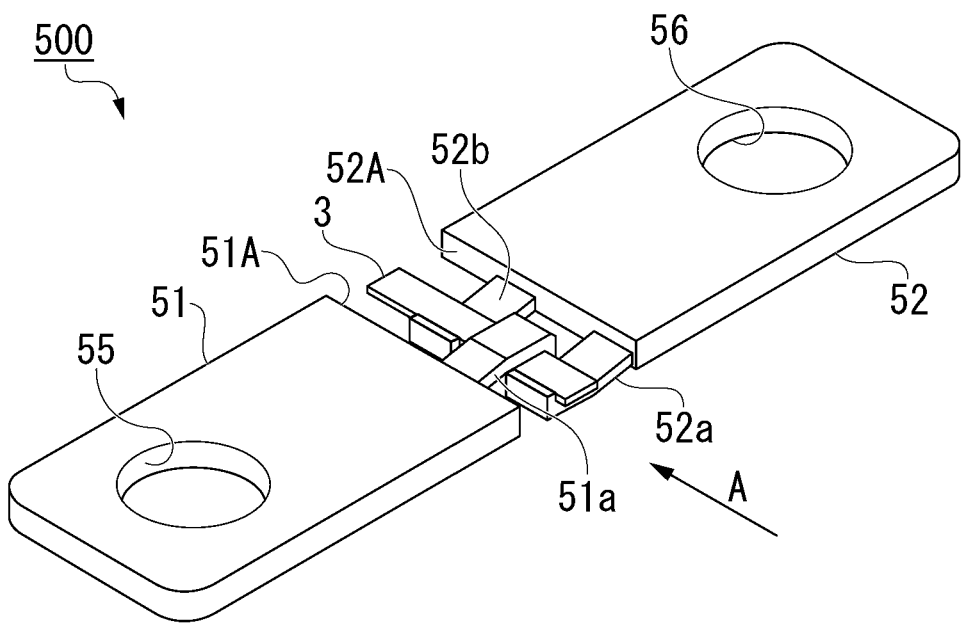
FIG. 11 is a schematic perspective view of a protection element according to a third embodiment.
Figure 12:
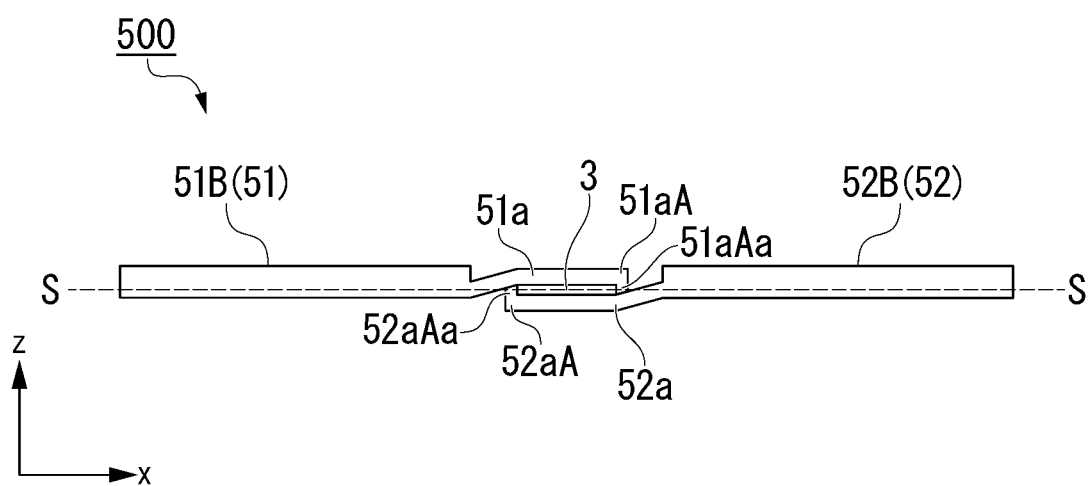
FIG. 12 is a schematic side view of the protection element shown in FIG. 11 as viewed from a direction of an arrow A shown in FIG. 11.

FIGS. 11 and 12 are schematic views of a protection element according to a third embodiment, FIG. 11 is a schematic perspective view, and FIG. 12 is a schematic side view seen from a direction of an arrow A shown in FIG. 11. The members using the same reference numerals as those in the above embodiment have the same configuration, and a description thereof will be omitted. Further, even though the reference numerals are different from those of the above embodiment, a description of the members having the same function may be omitted. In FIG. 12, a dotted line of S-S indicates a plane (S-S plane) connecting center planes in a thickness direction of portions (portions that do not substantially change even after the fuse element material 3 is cut) 51B and 52B of the first electrode 51 and the second electrode 52 excluding the respective claw portions.

The protection element according to the third embodiment is mainly different from the protection element according to the above embodiment in that not only the second electrode but also the first electrode has a spring property.

Specifically, a protection element 500 shown in FIGS. 11 and 12 includes a first electrode 51 having a spring property, a second electrode 52 having a spring property, and a fuse element material 3 disposed between the first electrode 51 and the second electrode 52. The fuse element material 3 is supported by being interposed between the first electrode 51 in a bent state and the second electrode 52 in a bent state. In addition, the first electrode 51 and the second electrode 52 have external terminal holes 55 and 56, respectively.

<First Electrode>

Since the first electrode 51 has a spring property, the same material as the second electrode 2 of the first embodiment can be used. The first electrode 51 has a claw portion 51a for stably supporting the fuse element material 3 at one end MA thereof. In addition, a tip 51aA of the claw portion 51a of the first electrode 51 is provided with a bent portion 51aAa bent toward the fuse element material 3 in order to support the fuse element material 3 more stably. The external terminal hole 55 of the first electrode 51 can have the same configuration as the external terminal hole 45 of the first electrode 41 of the second embodiment or the external terminal hole 45A of the first electrode 41AA. In the protection element 500 shown in FIG. 11, although the first electrode 51 has the external terminal hole 55, the external terminal hole may not be provided.

The thickness of the first electrode 51 may be the same as a whole, or may have portions having different thicknesses. For example, only a portion (the claw portion 51a in the example of FIG. 11) that supports the fuse element material in an interposed manner is thinned and the other portions are not thinned, whereby the spring property for interposing the fuse element material 3 can be enhanced while maintaining rigidity as a connection terminal to the outside.

As a method for thinning a part (the claw portion 51a in the example of FIG. 11) of the first electrode 51, for example, a known metal processing method such as rolling can be used.

<Second Electrode>

The second electrode 52 can be made of the same material as the second electrode 2 of the first embodiment. The second electrode 52 has claw portions 52a and 52b for stably supporting the fuse element material 3 at one end 52A thereof. In addition, a tip 52aA of the claw portion 52a and a tip (not shown) of the claw portion 52b of the second electrode 52 are respectively provided with a bent portion 52aAa and a bent portion (not shown) bent toward the fuse element material 3 in order to support the fuse element material 3 more stably. The external terminal hole 56 of the second electrode 52 can have the same configuration as the external terminal hole 46 of the second electrode 42 of the second embodiment or the external terminal hole 46A of the second electrode 42AA. In the protection element 500 shown in FIGS. 11 and 12, although the second electrode 52 has the external terminal hole 56, the external terminal hole may not be provided.

Figure 13:
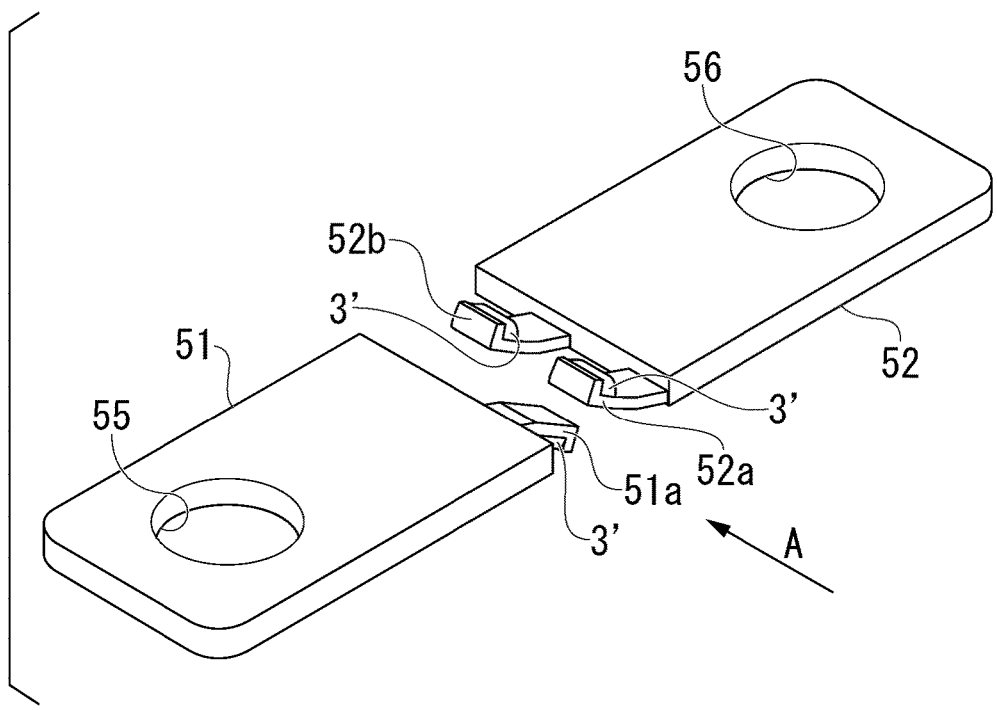
FIG. 13 is a schematic perspective view of the protection element shown in FIGS. 11 and 12 after cutting a fuse element material.
Figure 14:
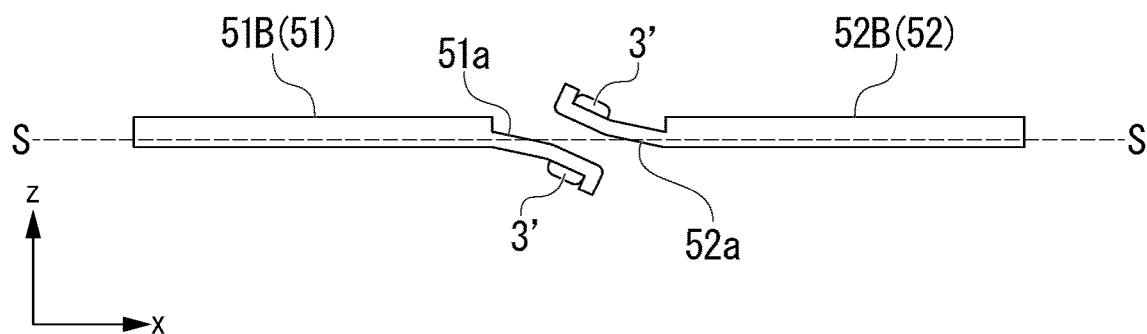
FIG. 14 is a schematic side view of the protection element shown in FIG. 13 as viewed from a direction of an arrow A shown in FIG. 13.

FIGS. 13 and 14 are schematic views of the protection element 500 shown in FIGS. 11 and 12 after cutting a fuse element material. FIG. 13 is a schematic perspective view, and FIG. 14 is a schematic side view seen from a direction of an arrow A shown in FIG. 13. In FIG. 14, a direction indicated by the reference numeral x is a direction parallel to the S-S plane and connects the portions 51B and 52B of the first electrode 51 and the second electrode 52 excluding the respective claw portions, while a direction indicated by the reference numeral z is a direction parallel to a thickness direction of the first electrode 51 or the second electrode 52. In FIGS. 13 and 14, the reference numeral 3' denotes a fuse element material 3 divided by cutting.

As shown in FIGS. 11 to 14, the claw portion 51a, which is a bent portion (in other words, a portion having a spring property) in the first electrode 51, is located on a upper side than the S-S plane in the z direction before the fuse element material 3 is cut (see FIG. 12), but is located on a lower side than the S-S plane after the fuse element material 3 is cut (see FIG. 14). In other words, the claw portion 51a of the first electrode 51 is located on a lower side than the S-S plane in a state where there is no bending force, but is bent so as to push the fuse element material 3 from above. The claw portion 51a of the first electrode 51 returns to the original state by the elastic restoring force after the bending force is lost due to the cutting of the fuse element material 3. That is, the claw portion 51a of the first electrode 51 is in a state where no external force acts as shown in FIGS. 13 and 14.

Similarly, the claw portions 52a and 52b, which are bent portions (in other words, portions having a spring property) in the second electrode 52, are located on a lower side than the S-S plane in the z direction before the fuse element material 3 is cut (see FIG. 12), but are located on an upper side than the S-S plane after the fuse element material 3 is cut (see FIG. 14). In other words, the claw portions 52a and 52b of the second electrode 52, which are located on an upper side than the S-S plane in a state where there is no bending force, are bent so as to push the fuse element material 3 from below. The claw portions 52a and 52b of the second electrode 52 return to the original state by the elastic restoring force after the bending force is lost due to the cutting of the fuse element material 3. That is, the second electrode 52 (the portion 52B of the second electrode 52 excluding the claw portion and the claw portions 52a and 52b) is in a state where no external force acts as shown in FIGS. 13 and 14.

The method of bending the first electrode 51 and the second electrode 52 of FIGS. 11 to 14 (positions of the claw portion 51a and the claw portions 52a and 52b before and after the fuse element material 3 is cut) is an example, and can be optionally set as long as the effects of the present invention are exhibited.

Figure 15:
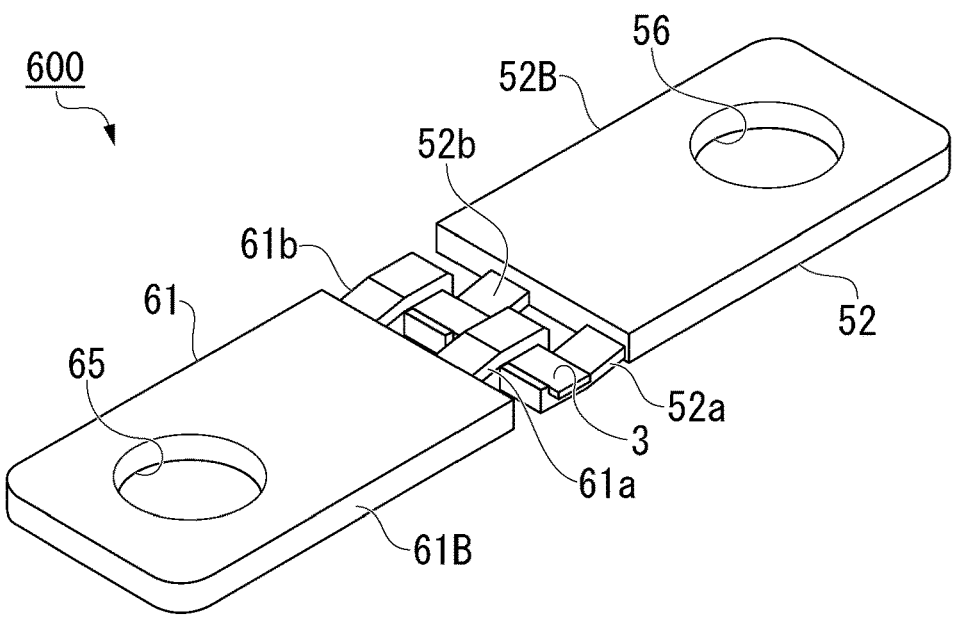
FIG. 15 is a schematic perspective view of another example of the protection element according to the third embodiment.
Figure 16:
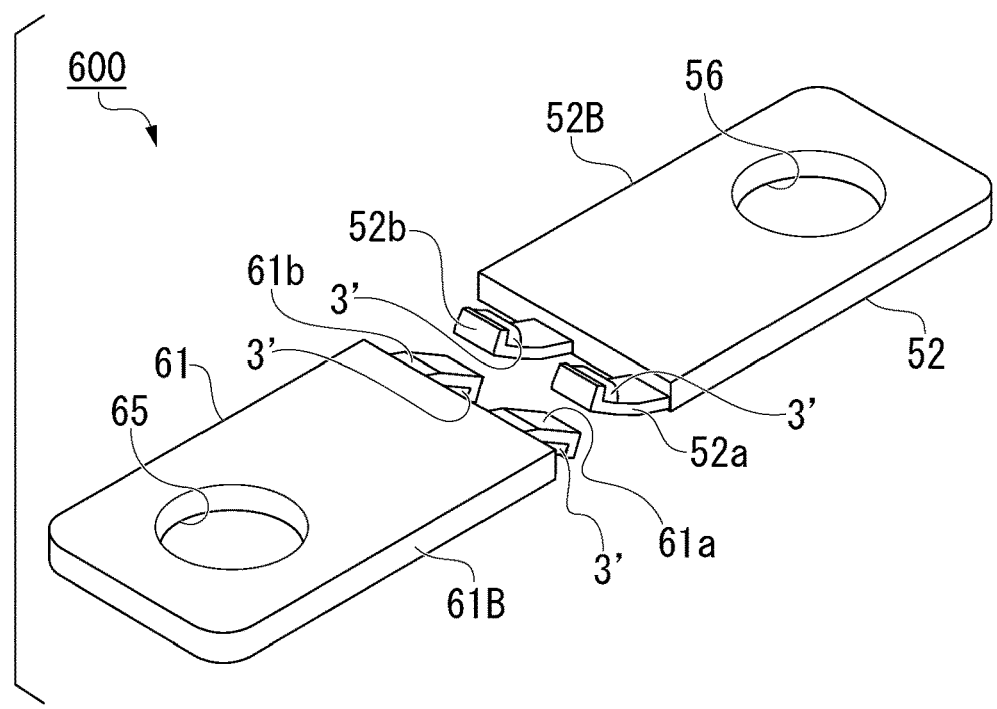
FIG. 16 is a schematic perspective view of the protection element shown in FIG. 15 after cutting a fuse element material.

FIGS. 15 and 16 are schematic views of a protection element in which the first electrode having a spring property has two claw portions. FIG. 15 is a schematic perspective view, and FIG. 16 is a schematic perspective view after interruption by an overcurrent. The members using the same reference numerals as those in the above embodiment have the same configuration, and a description thereof will be omitted. Further, even though the reference numerals are different from those of the above embodiment, a description of the members having the same function may be omitted.

Specifically, a protection element 600 shown in FIG. 15 includes a first electrode 61 having a spring property, a second electrode 52 having a spring property, and a fuse element material 3 disposed between the first electrode 61 and the second electrode 52. The fuse element material 3 is supported by being interposed between the first electrode 61 in a bent state and the second electrode 52 in a bent state. The first electrode 61 has two claw portions (61a and 61b) for stably supporting the fuse element material 3 at one end thereof. In addition, the first electrode 61 has an external terminal hole 65.

As shown in FIGS. 15 and 16, the claw portions 61*a* and 61*b*, which are bent portions (portions having a spring property) in the first electrode 61, are located on an upper side than a portion 61B of the first electrode 61 excluding the claw portions in a thickness direction before the fuse element material 3 is cut (see FIG. 15), but are located on a lower side than the portion 61B after the fuse element material 3 is cut (see FIG. 16). In other words, the claw portions 61*a* and 61*b* of the first electrode 61 are located on a lower side than the portion 61B in a state where there is no bending force, but are bent so as to push the fuse element material 3 from above. The claw portions 61*a* and 61*b* of the first electrode 61 return to the original state after the bending force is lost due to the cutting of the fuse element material 3. That is, the claw portions 51*a* and 51*b* of the first electrode 51 are in a state where no external force acts as shown in FIG. 16.

Similarly, claw portions 52*a* and 52*b*, which are bent portions (portions having a spring property) in the second electrode 52, are located on a lower side than a portion 52B of the second electrode 52 excluding the claw portions in the z direction before the fuse element material 3 is cut (see FIG. 15), but are located on an upper side than the portion 52B after the fuse element material 3 is cut (see FIG. 16). In other words, the claw portions 52*a* and 52*b* of the second electrode 52 are located on an upper side than the portion 52B in a state where there is no bending force, but are bent so as to push up the fuse element material 3 from below. The claw portions 52*a* and 52*b* of the second electrode 52 return to the original state after the bending force is lost due to the cutting of the fuse element material 3. That is, the second electrode 52 (the portion 52B of the second electrode 52 excluding the claw portion and the claw portions 52*a* and 52*b*) is in a state where no external force acts as shown in FIG. 16.

Figure 17:
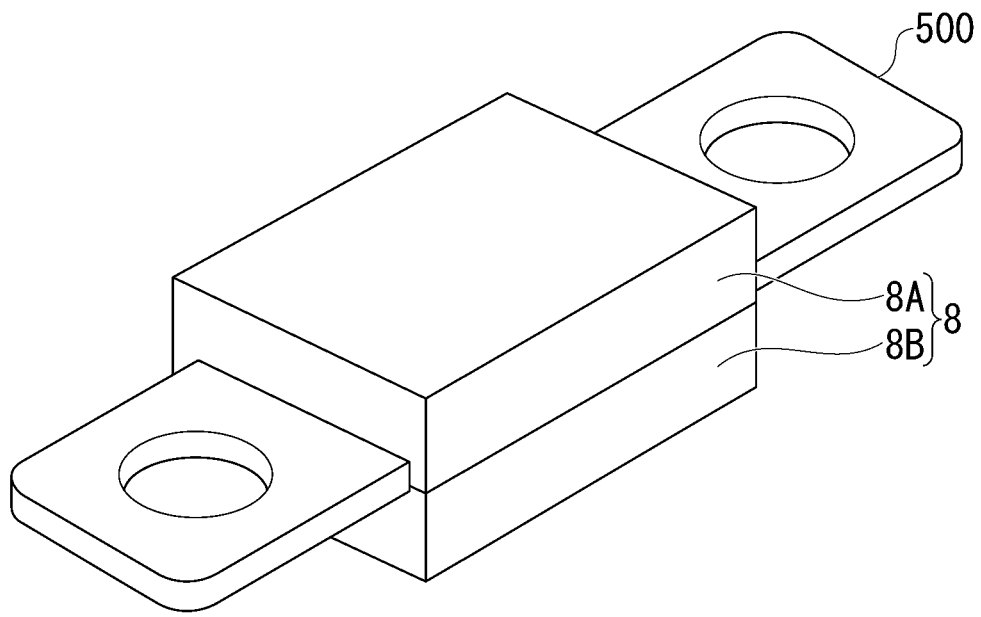
FIG. 17 is a schematic view of the protection element shown in FIGS. 11 and 12, in which a portion including the fuse element material is covered with a cover, and is a schematic perspective view of the protection element in a state of being covered with an upper cover and a lower cover.
Figure 18:
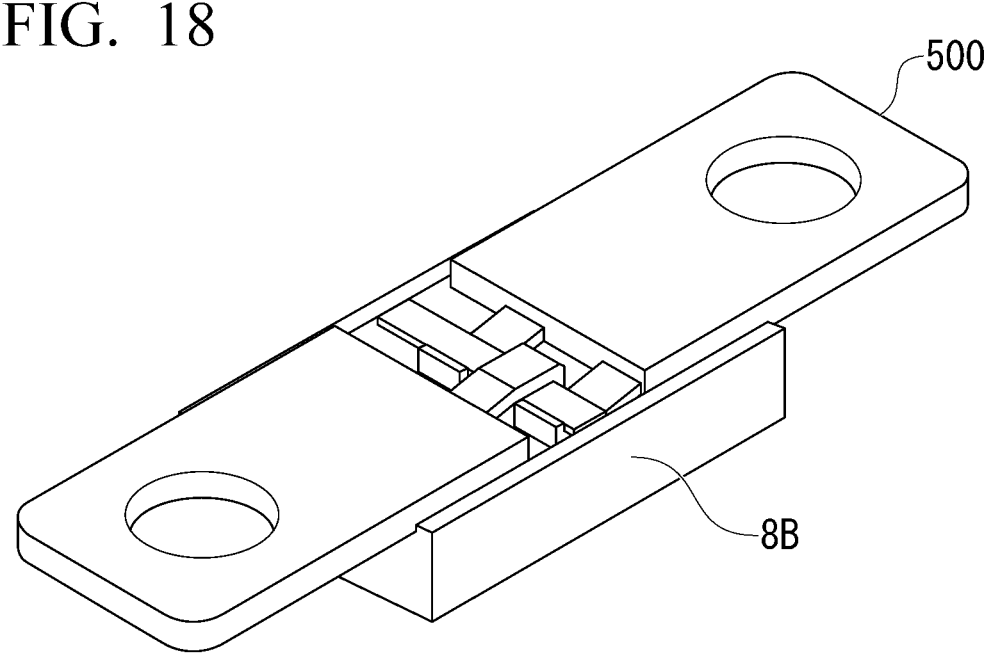
FIG. 18 is a schematic perspective view of a state where the upper cover of FIG. 15 is removed.

FIGS. 17 and 18 are schematic views of the protection element 500 shown in FIGS. 11 and 12, in which a portion including the fuse element material 3 is covered with a cover 8, FIG. 17 is a schematic perspective view of the protection element 500 in a state of being covered with an upper cover 8A and a lower cover 8B, and FIG. 18 is a schematic perspective view of a state where the upper cover 8A is removed.

As the cover 8 (the upper cover 8A and the lower cover 8B), for example, a cover made of an insulating resin or the like can be used.

The cover 8 (the upper cover 8A and the lower cover 8B) can also be used for a protection element according to another embodiment.

Fourth Embodiment

Figure 19:
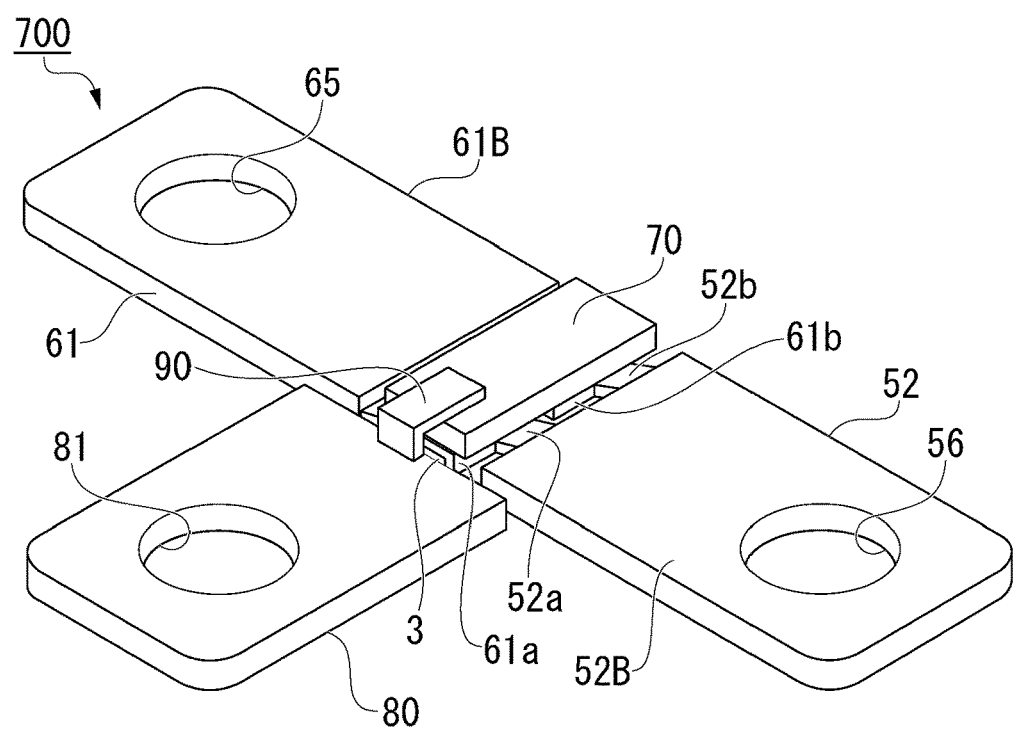
FIG. 19 is a schematic perspective view of a protection element according to a fourth embodiment.
Figure 20:
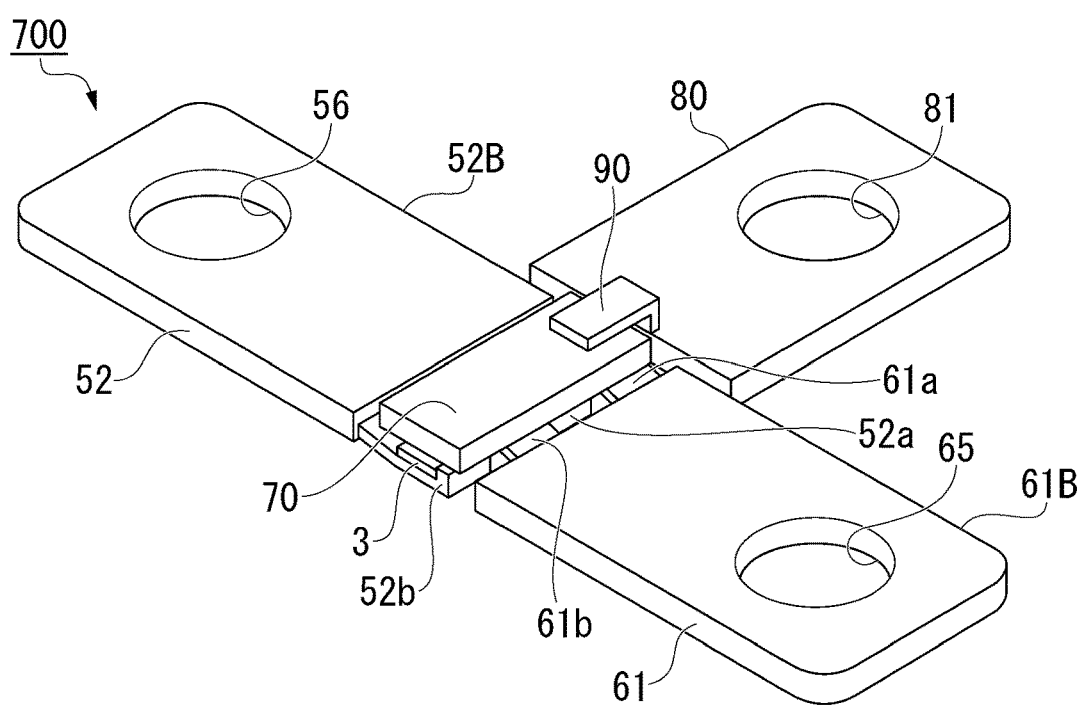
FIG. 20 is a schematic perspective view of the protection element shown in FIG. 19 as viewed from a side opposite to that of FIG. 19.

FIGS. 19 and 20 are schematic views of a protection element according to a fourth embodiment, FIG. 19 is a schematic perspective view, and FIG. 20 is a schematic perspective view seen from a side opposite to that of FIG. 19. The members using the same reference numerals as those in the above embodiment have the same configuration, and a description thereof will be omitted. Further, even though the reference numerals are different from those of the above embodiment, a description of the members having the same function may be omitted.

The protection element according to the fourth embodiment is mainly different from the protection element according to the above embodiment in that a heat generating body that heats a fuse element material and a third electrode that supplies a current to the heat generating body are further provided.

A protection element 700 according to the fourth embodiment shown in FIGS. 19 and 20 is an example in which the protection element 600 shown in FIG. 15 further includes a heat generating body that heats a fuse element material and a third electrode that supplies a current to the heat generating body. Specifically, the protection element 700 includes a first electrode 61 having a spring property, a second electrode 52 having a spring property, and a fuse element material 3 disposed between the first electrode 61 and the second electrode 52, in which the fuse element material 3 is supported by being interposed between the first electrode 61 in a bent state and the second electrode 52 in a bent state. The protection element 700 further includes a heat generating body 70 that heats the fuse element material 3 and a third electrode 80 that supplies a current to the heat generating body 70. In addition, in the protection element 700, the first electrode 61, the second electrode 52, and the third electrode 80 have external terminal holes 65, 56, and 81, respectively.

In the protection element 700 shown in FIGS. 19 and 20, the heat generating body 70 and the third electrode 80 are connected to each other by a conductive connecting portion 90. In addition, the third electrode 80 is separated from both the first electrode 61 and the second electrode 52 and is not connected thereto.

In the protection element 700 shown in FIGS. 19 and 20, the heat generating body 70 is connected to the first electrode 61. More specifically, the heat generating body 70 is connected to claw portions 61*a* and 61*b* of the first electrode 61. The heat generating body 70 may be joined to either the second electrode 52 or the fuse element material 3.

The heat generating body 70 is a conductive member that has a relatively high resistance value and generates heat when a current is supplied, and may be made of, for example, W, Mo, or Ru.

The third electrode 80 is made of a conductive material, and the same material as the first electrode 1 described above can be used.

The protection element 700 shown in FIGS. 19 and 20 includes the heat generating body 70 and the third electrode 80, and the third electrode 80 is connected to the first electrode 61. Therefore, a current can be made to flow between the third electrode 80 and the first electrode 61 to cause the heat generating body 70 to generate heat and the fuse element material 3 can be heated. Thereby, the fuse element material 3 can be cut.

Figure 21:
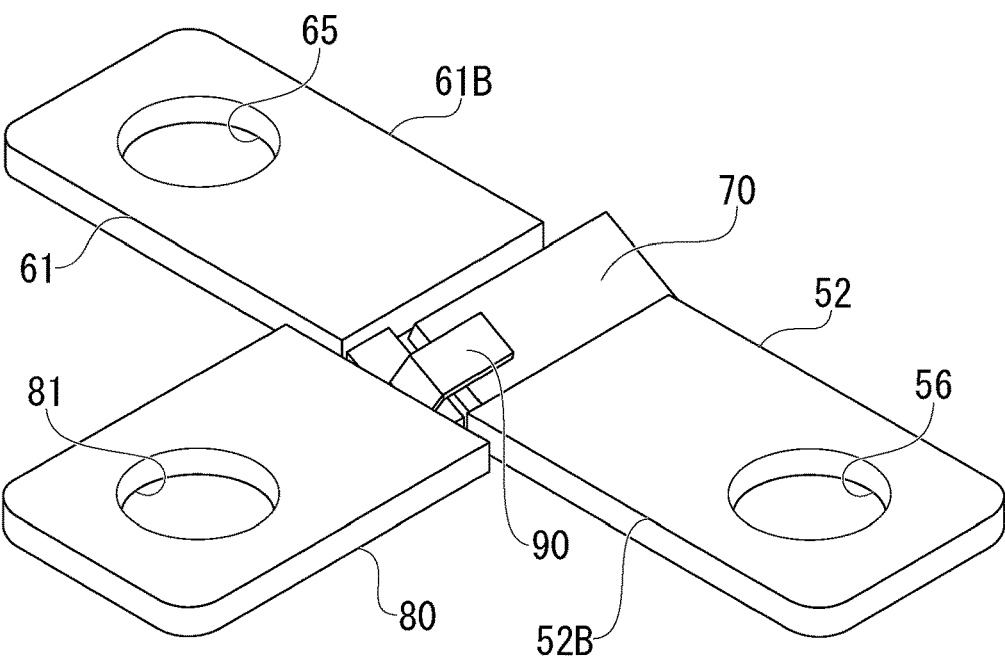
FIG. 21 is a schematic perspective view of the protection element shown in FIGS. 19 and 20 after cutting a fuse element material, and is a diagram corresponding to FIG. 19.
Figure 22:
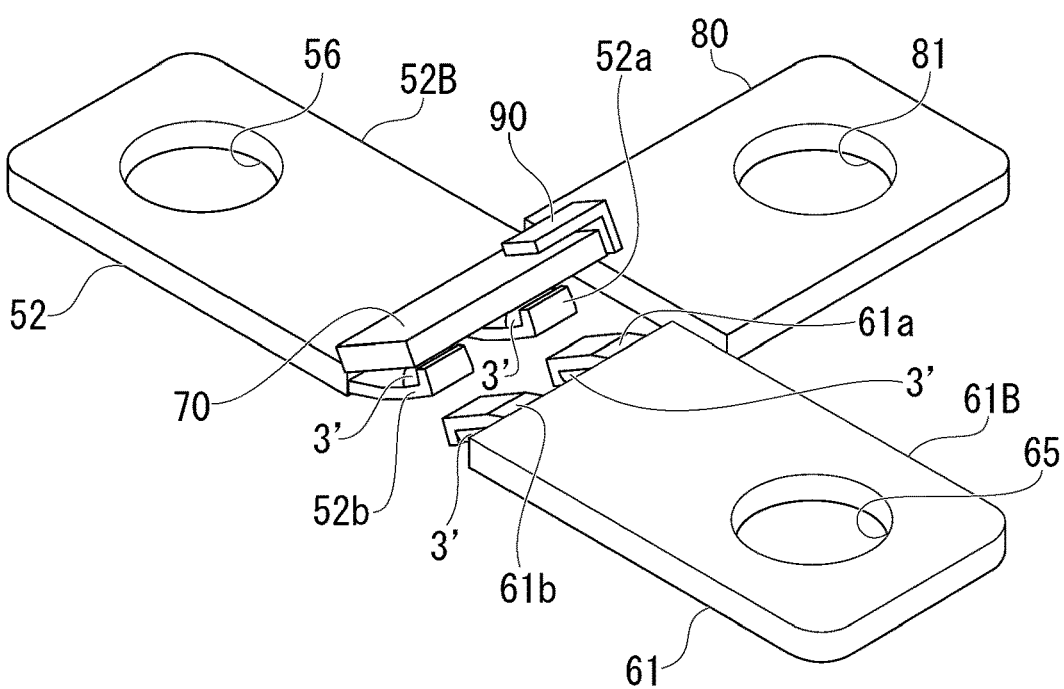
FIG. 22 is a schematic perspective view of the protection element shown in FIGS. 19 and 20 after cutting the fuse element material, and is a diagram corresponding to FIG. 20.

FIGS. 21 and 22 show schematic perspective views of the protection element 700 shown in FIGS. 19 and 20 after cutting the fuse element material. FIGS. 21 and 22 correspond to FIGS. 19 and 20, respectively.

As shown in FIGS. 21 and 22, the claw portions 61*a* and 61*b*, which are bent portions in the first electrode 61, are located on an upper side than a portion 61B of the first electrode 61 excluding the claw portions in a thickness direction before the fuse element material 3 is cut (see FIG. 20), but are located on a lower side than the portion 61B after the fuse element material 3 is cut (see FIG. 22). In other words, the claw portions 61*a* and 61*b* of the first electrode 61, which are located on a lower side than 61B in a state where there is no bending force, are bent so as to push the fuse element material 3 from above, but return to the original state after the bending force is lost due to the cutting of the fuse element material 3.

Similarly, claw portions 52*a* and 52*b*, which are bent portions in the second electrode 52, are located on a lower side than a portion 52B of the second electrode 52 excluding the claw portions in a thickness direction before the fuse element material 3 is cut (see FIG. 20), but are located on an upper side than the portion 52B of the second electrode 52 excluding the claw portions after the fuse element material 3 is cut (see FIG. 22). In other words, the claw portions 52a and 52b of the second electrode 52, which are located on an upper side than the portion 52B of the second electrode 52 excluding the claw portions in a state where there is no bending force, are bent so as to push up the fuse element material 3 from below, but return to the original state after the bending force is lost due to the cutting of the fuse element material 3.

Before the fuse element material 3 is cut, a lower surface of the heat generating body 70 is in contact with the claw portions 61a and 61b of the first electrode 61, but after the fuse element material 3 is cut, the lower surface of the heat generating body 70 comes into contact with the claw portions 52a and 52b of the second electrode 52. Further, the connecting portion 90 is separated from the third electrode 80, and the current supply to the heat generating body 70 is cut off, thereby stopping the heat generation of the heat generating body 70.

Fifth Embodiment

Figure 23:
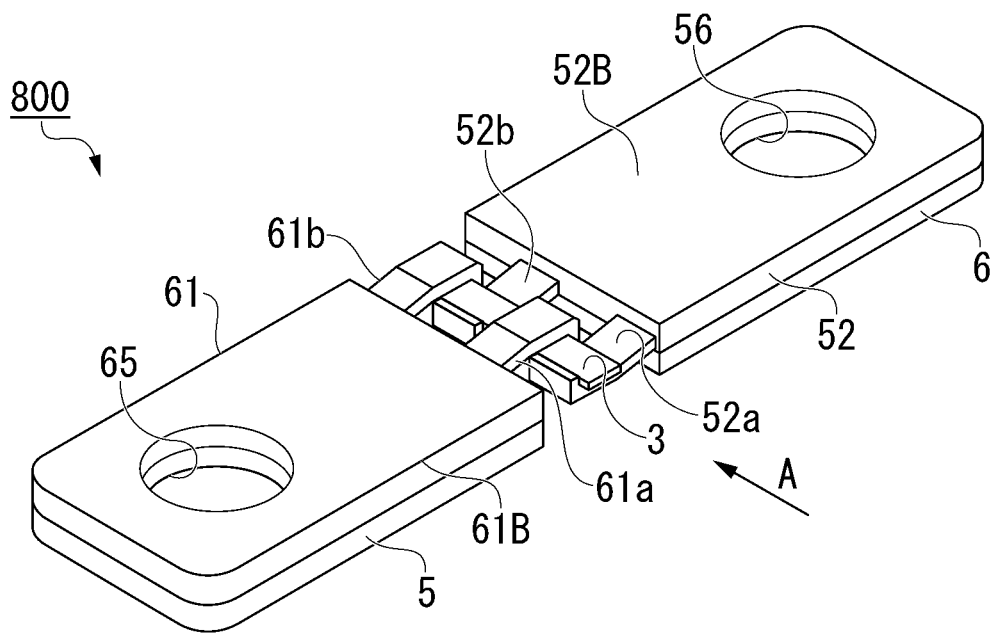
FIG. 23 is a schematic perspective view of a protection element according to a fifth embodiment.
Figure 24:
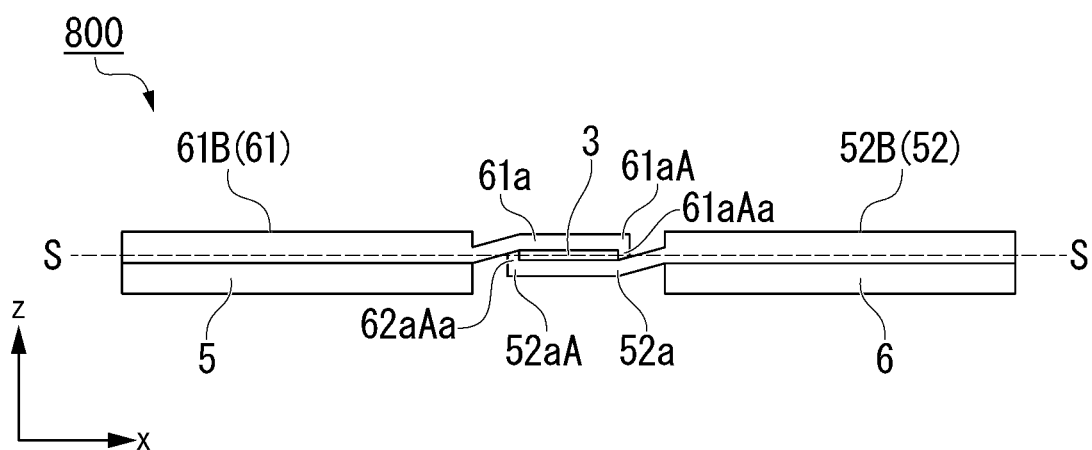
FIG. 24 is a schematic side view of the protection element shown in FIG. 23 as viewed from a direction of an arrow A shown in FIG. 23.

FIGS. 23 and 24 are schematic views of a protection element according to a fifth embodiment, FIG. 23 is a schematic perspective view, and FIG. 24 is a schematic side view seen from a direction of an arrow A shown in FIG. 23. The members using the same reference numerals as those in the above embodiment have the same configuration, and a description thereof will be omitted. Further, even though the reference numerals are different from those of the above embodiment, a description of the members having the same function may be omitted.

The protection element according to the fifth embodiment is mainly different from the protection element according to the above embodiment in that a first terminal member is connected to a first electrode such that they overlap each other in a thickness direction, and a second terminal member is connected to a second electrode such that they overlap each other in a thickness direction. The first terminal member and the second terminal member reinforce rigidity for connecting the first electrode and the second electrode to the outside, respectively, and reduce the electric resistance.

A protection element 800 shown in FIG. 23 is an example in which a first terminal member 5 is connected to the first electrode 61 and a second terminal member 6 is connected to the second electrode 52 with respect to the protection element 600 shown in FIG. 15. The first terminal member 5 has an external terminal hole at a position corresponding to the external terminal hole 65 of the first electrode 61. In addition, the second terminal member 6 has an external terminal hole at a position corresponding to the external terminal hole 56 of the second electrode 52.

<First Terminal Member and Second Terminal Member>

Examples of the material of the first terminal member 5 and the second terminal member 6 include copper and brass. Among them, brass is preferable from the viewpoint of rigidity enhancement. Among them, copper is preferable from the viewpoint of reduction of electric resistance. The materials of the first terminal member 5 and the second terminal member 6 may be the same as or different from each other.

As a method for connecting the first terminal member 5 and the second terminal member 6 to the first electrode 61 and the second electrode 52, a known method can be used, and examples thereof include joining by welding and mechanical joining such as rivet joining and screw joining.

The thicknesses of the first terminal member 5 and the second terminal member 6 are not limited, but may be about 0.3 to 1.0 mm. The thicknesses of the first terminal member 5 and the second terminal member 6 may be the same as or different from each other.

In the protection element 800 shown in FIGS. 23 and 24, the first terminal member 5 and the second terminal member 6 are provided so as to cover the entire surface of the portion 61B of the first electrode 61 excluding the claw portions 61a and 61b and the entire surface of the portion 52B of the second electrode 52 excluding the claw portions 52a and 52b, respectively, but a covering range and a covering shape can be optionally set as long as at least one effect of rigidity enhancement and reduction of electric resistance is exhibited. In addition, the portion 61B of the first electrode 61 excluding the claw portions 61a and 61b and the portion 52B of the second electrode 52 excluding the claw portions 52a and 52b need not cover regions of the positions of the external terminal holes 65 and 56, respectively, but may be connected to a part of the first terminal member 5 and a part of the second terminal member 6 such that they overlap each other, respectively.

Figure 25:
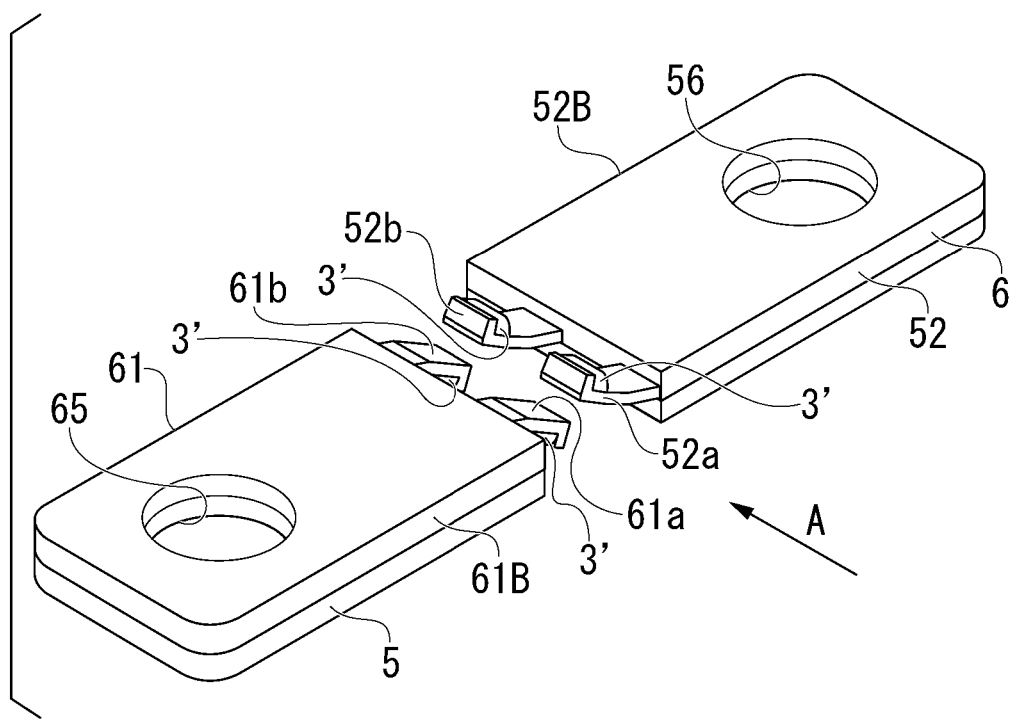
FIG. 25 is a schematic perspective view of the protection element shown in FIGS. 23 and 24, in which a fuse element material is cut, as viewed from a direction corresponding to FIG. 23.
Figure 26:
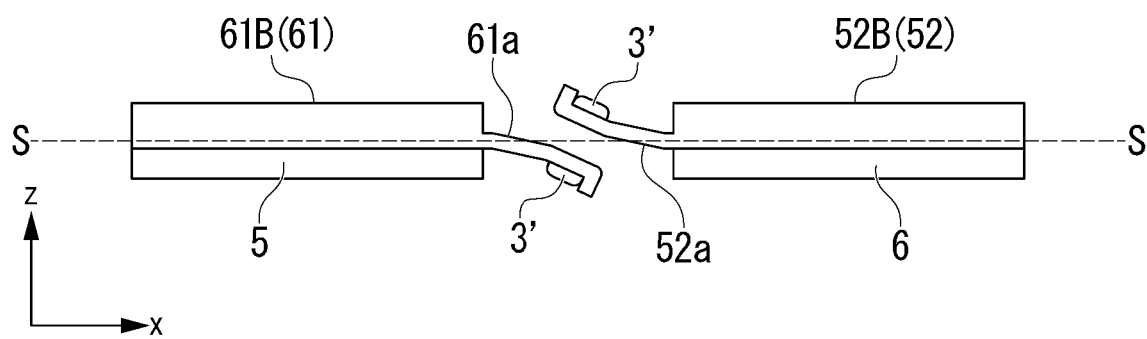
FIG. 26 is a schematic side view of the protection element shown in FIGS. 23 and 24, in which a fuse element material is cut, as viewed from a direction corresponding to FIG. 24.

FIGS. 25 and 26 are schematic views of the protection element 800 shown in FIGS. 23 and 24 after cutting a fuse element material. FIG. 25 is a schematic perspective view, and FIG. 26 is a schematic side view seen from a direction of an arrow A shown in FIG. 25. The members using the same reference numerals as those in the above embodiment have the same configuration, and a description thereof will be omitted. Further, even though the reference numerals are different from those of the above embodiment, a description of the members having the same function may be omitted.

In the protection element 800 according to the fifth embodiment, the first electrode 61 and the second electrode 52 are provided with the first terminal member 5 and the second terminal member 6, respectively, whereby rigidity is enhanced. Therefore, the overall thickness of each of the first electrode 61 and the second electrode 52 can be reduced, and the spring property can be easily adjusted. That is, the adjustment ranges of the thicknesses of the first electrode 61 and the second electrode 52 are widened. In addition, with respect to the first electrode 61 or the second electrode 52, in the configuration in which only the portion that supports the fuse element material in an interposed manner as described above is thinned, the portion can be further thinned by providing the first terminal member 5 and the second terminal member 6.

Sixth Embodiment

Figure 27:
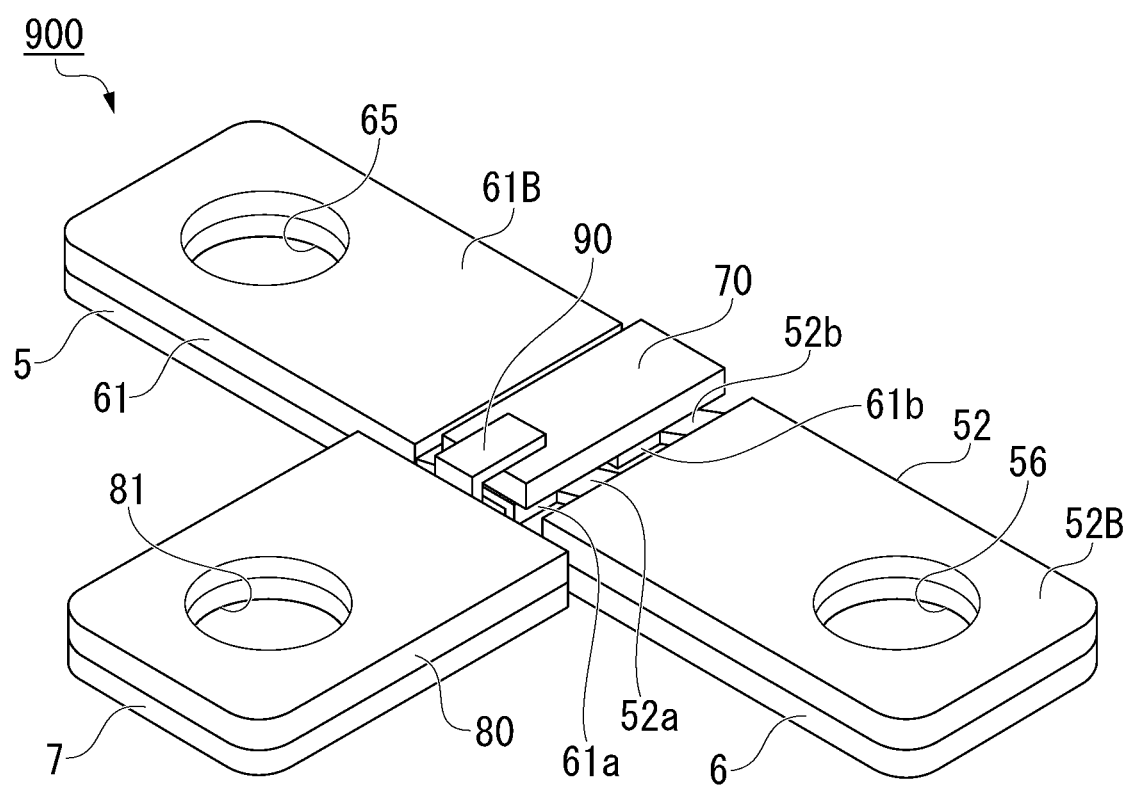
FIG. 27 is a schematic perspective view of a protection element according to a sixth embodiment.

FIG. 27 is a schematic perspective view of a protection element according to a sixth embodiment. The members using the same reference numerals as those in the above embodiment have the same configuration, and a description thereof will be omitted. Further, even though the reference numerals are different from those of the above embodiment, a description of the members having the same function may be omitted.

The protection element according to the sixth embodiment is mainly different from the protection element according to the fifth embodiment in that a heat generating body that heats a fuse element material, a third electrode that supplies a current to the heat generating body, and a connecting portion that connects the heat generating body and the third electrode to each other are further provided, and a third terminal member is also connected to the third electrode such that they overlap each other in a thickness direction. The third terminal member reinforces rigidity for connecting the third electrode to the outside and reduces electric resistance, similarly to the first terminal member or the second terminal member.

A protection element 900 shown in FIG. 27 is an example in which a first terminal member 5 is connected to the first electrode 61, a second terminal member 6 is connected to the second electrode 52, and a third terminal member 7 is connected to the third electrode 80 with respect to the protection element 700 shown in FIG. 19. The first terminal member 5 has an external terminal hole at a position corresponding to the external terminal hole 65 of the first electrode 61. In addition, the second terminal member 6 has an external terminal hole at a position corresponding to the external terminal hole 56 of the second electrode 52. In addition, the third terminal member 7 has an external terminal hole at a position corresponding to the external terminal hole 81 of the third electrode 80. In addition, the portion 61B of the first electrode 61 excluding the claw portions and the portion 52B of the second electrode excluding the claw portions need not cover regions of the positions of the external terminal holes 65 and 56, respectively, but may be connected to a part of the first terminal member 5 and a part of the second terminal member 6 such that they overlap each other, respectively. Further, the third electrode 80 may be eliminated and the connecting portion 90 may be directly connected to the third terminal member 7.

<Third Terminal Member>

When the materials of the first terminal member 5 and the second terminal member 6 are different from each other, the material of the third terminal member 7 may be the same as or different from either of them. In addition, the material of the third terminal member 7, the material of the first terminal member 5, and the material of the second terminal member 6 may be the same.

As a method for connecting the third terminal member 7 to the third electrode 80, the same method as the method for connecting the first terminal member 5 or the second terminal member 6 to the first electrode 61 or the second electrode 52 can be used.

The thickness of the third terminal member 7 is about the same as the thickness of the first terminal member 5 or the second terminal member 6, and may be the same as or different from one of them. The thickness of the third terminal member 7, the thickness of the first terminal member 5, and the thickness of the second terminal member 6 may all be the same.

REFERENCE SIGNS LIST

1, 21, 41, 41AA, 51, 61: First electrode
1a, 21a, 21b, 41a, 51a, 61a, 61b: Claw portion
2, 42, 42AA, 52: Second electrode
2a, 2b, 42a, 42b, 52a, 52b: Claw portion
3: Fuse element material
5: First terminal member
6: Second terminal member
7: Third terminal member
8: Cover
45, 45A, 46, 46A, 55, 56: External terminal hole
100, 200, 400, 400A, 500, 600, 700, 800, 900: Protection element

What is claimed is:

1. A protection element comprising:
a first electrode;
a second electrode having a spring property; and
a fuse element material that is disposed between the first electrode and the second electrode,
wherein the fuse element material is supported by being interposed between the first electrode and the second electrode in a bent state,
each of the first electrode and the second electrode has a claw portion at one end thereof,
the fuse element material is supported by being interposed among three or more claw portions of the first electrode and the second electrode, the claw portions being arranged alternately,
in the second electrode, a thickness of the claw portion is smaller than thicknesses of other portions, and
the fuse element material is supported by the claw portions of the second electrode in a state where the claw portions of the second electrode are bent.

2. The protection element according to claim 1,
wherein a tip of at least a part of the claw portions of the first electrode and the second electrode is bent toward the fuse element material.

3. The protection element according to claim 1,
wherein the fuse element material is made of a laminate including a high melting point metal layer and a low melting point metal layer, and
the fuse element material is cut by the spring property of the second electrode in a state where the low melting point metal layer softens at a melting point of the low melting point metal layer and the high melting point metal layer maintains rigidity.

4. The protection element according to claim 3,
wherein the low melting point metal layer is made of a Pb-free solder, and
the high melting point metal layer is made of Ag or Cu, or a metal containing Ag or Cu as a main component.

5. The protection element according to claim 1,
wherein a shearing force that is configured to cause the fuse element material to be sheared when an overcurrent flow is applied to the fuse element material from the first electrode and the second electrode.

6. The protection element according to claim 1,
wherein at least one of the first electrode and the second electrode are joined to the fuse element material by solder.

7. The protection element according to claim 1,
wherein the first electrode has a spring property, and the fuse element material is supported by being interposed between the first electrode in a bent state and the second electrode in a bent state.

8. The protection element according to claim 1,
wherein each of the first electrode and the second electrode has an external terminal hole.

9. The protection element according to claim 1,
wherein a first terminal member is connected to the first electrode, and
a second terminal member is connected to the second electrode.

10. The protection element according to claim 1, further comprising:
a heat generating body that is configured to heat the fuse element material; and
a third electrode that is configured to supply a current to the heat generating body.

11. The protection element according to claim 10,
wherein the heat generating body has one end connected to the third electrode and the other end connected to at least one of the fuse element material, the first electrode, and the second electrode.

12. The protection element according to claim 10, wherein a third terminal member is connected to the third electrode.

13. The protection element according to claim 3, wherein a shearing force that is configured to cause the fuse element material to be sheared when an overcurrent flow is applied to the fuse element material from the first electrode and the second electrode.

14. The protection element according to claim 3, wherein at least one of the first electrode and the second electrode are joined to the fuse element material by solder.

15. The protection element according to claim 3, wherein the first electrode has a spring property, and the fuse element material is supported by being interposed between the first electrode in a bent state and the second electrode in a bent state.

16. The protection element according to claim 3, wherein each of the first electrode and the second electrode has an external terminal hole.

17. The protection element according to claim 3, wherein a first terminal member is connected to the first electrode, and a second terminal member is connected to the second electrode.

18. The protection element according to claim 3, further comprising:
a heat generating body that is configured to heat the fuse element material; and
a third electrode that is configured to supply a current to the heat generating body.

19. The protection element according to claim 18, wherein the heat generating body has one end connected to the third electrode and the other end connected to at least one of the fuse element material, the first electrode, and the second electrode.

20. The protection element according to claim 18, wherein a third terminal member is connected to the third electrode.

* * * * *